E. LEHR.
ALTERNATING CURRENT ELECTROMAGNET.
APPLICATION FILED MAR. 2, 1910.
1,015,968.
Patented Jan. 30, 1912.
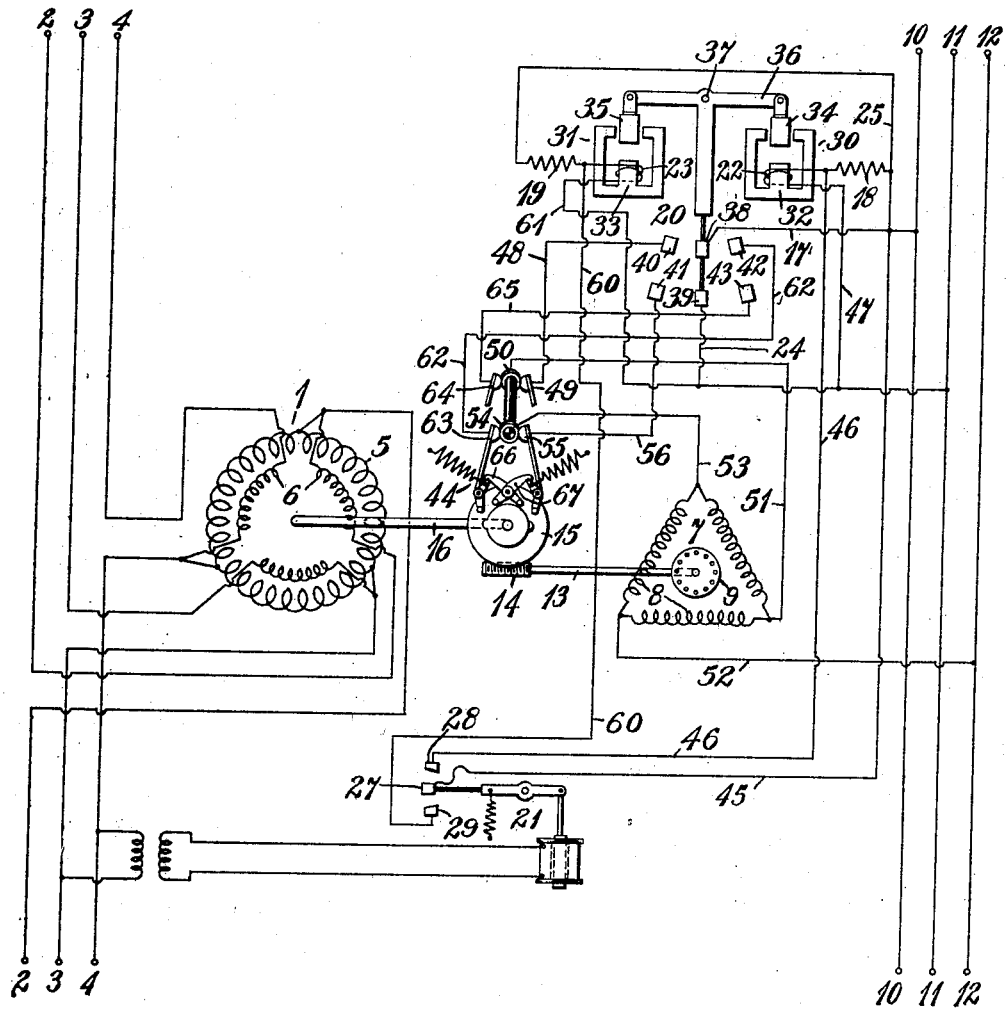
WITNESSES:
Fred H. Miller
D. H. Mace
INVENTOR
Edwin Lehr
BY
Wiley G. Carr
ATTORNEY

UNITED STATES PATENT OFFICE.

EDWIN LEHR, OF WILKINSBURG, PENNSYLVANIA, ASSIGNOR TO WESTINGHOUSE ELECTRIC AND MANUFACTURING COMPANY, A CORPORATION OF PENNSYLVANIA.

ALTERNATING-CURRENT ELECTROMAGNET.

1,015,968.  Specification of Letters Patent.  Patented Jan. 30, 1912.

Application filed March 2, 1910. Serial No. 546,856.

*To all whom it may concern:*

Be it known that I, EDWIN LEHR, a citizen of the United States, and a resident of Wilkinsburg, in the county of Allegheny and State of Pennsylvania, have invented a new and useful Improvement in Alternating-Current Electromagnets, of which the following is a specification.

My invention relates to alternating current electro-magnets having stationary and movable core members and particularly to those magnets which are used to operate or to control the operation of switching devices and other mechanisms.

The object of my invention is to provide a means for preventing the two core members of an alternating current magnet from sticking or "freezing", when the circuit which supplies the exciting winding with energy is interrupted.

Difficulty has frequently been experienced with apparatus operated or governed by alternating current magnets, for the reason that sufficient residual magnetization has been left in the core members, after interruption of the supply circuit, to hold the members of the magnet together, thus preventing the proper operation of the apparatus which the magnet was designed to actuate.

According to my present invention, I provide a means of maintaining a predetermined small alternating current through the magnet winding, whenever said magnet is not in actual service and thus produce a weak alternating flux which eliminates residual magnetization and consequent sticking of the core parts.

The single figure of the accompanying drawing is a diagrammatic view showing the circuit connections of an automatically controlled potential regulator to which my invention is applied.

In the drawing, a three phase potential regulator 1 is shown as receiving energy from a three phase source 2, 3 and 4, the primary coils 5 being connected in multiple with the source, and the secondary coils 6 being connected in series with the several line conductors 2, 3 and 4, it being understood that the primary coils 5 and the secondary coils 6 are provided with cores that are relatively rotatable, in accordance with usual practice.

An induction motor 7, having exciting windings 8 and a rotor 9, may be connected to a suitable source 10, 11 and 12. The shaft 13 of the induction motor is provided with a worm 14 to engage a worm wheel segment 15 which is mounted rigidly upon the shaft 16 of the potential regulator in such manner that the motion of the driving motor is transmitted to the rotor of the regulator to effect changes in the relative positions of the rotor and stator. The direction of rotation of the driving motor, and, consequently, of the regulator motor, is dependent upon the action of a secondary relay or reversing switch 20 and a primary relay 21 which is adapted to selectively energize magnet winding 22 and 23 of the secondary relay, according as the voltage of the circuit 2, 3 and 4 rises above or falls below a predetermined normal value. The primary relay 21 is of meter construction and is so adjusted that its movable member 27 may make contact with either of the stationary contact terminals 28 and 29, according to the voltage conditions of the circuit to be regulated. The meter relay 21 may, of course, be adapted to current or any other function of the circuit. The secondary relay is essentially an electrically operated reversing switch and comprises two electro-mangets 30 and 31 having windings 22 and 23, stationary core members 32 and 33, and movable core members 34 and 35, respectively. The movable core members 34 and 35 are supported by a member 36 which is mounted upon a pivot 37 to rock in the one direction or the other as actuated by the magnets. The motion of the rocking member 36 causes the movable contact pieces 38 and 39 to engage either the stationary contact terminals 40 and 41 or the contact terminals 42 and 43, thus completing the motor circuits. Resistances 18 and 19 are so utilized in connection with the magnet windings 22 and 23 as to cut down the current in these windings to a predetermined amount when the windings are not in active service, thus eliminating the sticking effect of the movable and stationary core members and allowing their separation when the energizing circuit is broken.

In order to prevent the movable core of the regulator from being carried beyond the limit of its normal movement, I provide a limit switch 44 which is actuated by means of projections upon the worm wheel segment 15 and serves to interrupt the driving motor circuit and bring the rotor to rest. The limit switch 44, here illustrated, is described in detail in a co-pending application by H. A. Steen, Serial No. 531,058, filed December 2, 1909. The switch 44 and the primary relay 21 may be replaced by any other suitable means for accomplishing the same results, and the structural details of the secondary relay 20 may also be replaced by others for accomplishing the same purpose.

The operation of and connection for the system illustrated, are as follows: Assuming that the voltage condition of the circuit 2, 3 and 4 is normal and that the various parts of apparatus occupy the positions shown on the diagram, a small current is maintained through the resistance 18 and 19 and the magnet windings 22 and 23, the circuit connections for the winding 22 being as follows: through conductor 25, resistance 18, magnet winding 22 and conductor 47, while that for the winding 23 is by way of conductor 25, resistance 19, magnet winding 23 and conductor 61. If the potential of the feeder circuit rises above its normal value, the movable member 27 of the primary relay 21 is caused to engage the stationary contact terminal 28, thus short circuiting the resistance 18 and energizing the magnet winding 22 through the conductor 45, movable member 27, contact terminal 28, conductor 46, magnet winding 22 and conductor 47. The pull exerted by the magnet 30 moves the rocking member 36 to bring the contact pieces 38 and 39 into engagement with stationary contact terminals 40 and 41 and thus complete the motor circuits through conductor 17, contact members 38 and 40, conductor 48, the contact members 49 and 50 of the limit switch and conductor 51 to the exciting winding of the induction motor. The return circuits are as follows:—one directly through the conductor 52 to one leg of the source, and the other through conductor 53, contact members 54 and 55 of the limit switch, conductor 56, contact members 41 and 39, and conductor 24 to the remaining leg of the source. The motor circuits being completed, the motor tends to operate the rotor of the regulator in such direction as to effect a decrease in the voltage. When the relative positions of the stationary and movable core members of the regulator are such that the potential of the feeder circuit is restored to its normal value, the movable member 27 of the primary relay becomes disengaged from stationary contact terminal 28 and the magnet winding 22 is deënergized, leaving the resistance 18 in circuit with it to cut down the current to a small value and prevent the core members from sticking together. The rocking member 36 having been released, it returns to its normal position and interrupts the motor circuits. Should the potential of the feeder circuit now fall below its normal value, the movable member 27 of the primary relay completes a circuit through the magnet winding 23 by way of conductor 45, movable member 27, stationary contact terminal 29, conductor 60, magnet winding 23 and conductor 61. The member 36 of the secondary relay is then rocked upon its pivot 37 to establish connection between the movable contact pieces 38 and 39 and the stationary contact terminals 42 and 43, thus completing the motor circuits through the conductor 17, contact members 28 and 42, conductor 62, contact members 63 and 54 of the limit switch and conductor 53 to the driving motor. The return circuits are as follows:—one by the way of conductor 52 to the source, and the other by way of conductor 51, contact members 50 and 64 of the limit switch, conductor 65, contact members 43 and 39 and conductors 24 to the source. Under these conditions, as will be readily understood, the driving motor is operated in the reverse direction and actuates the movable core of the regulator in the opposite direction until the normal voltage of the feeder circuits is restored.

In actual service, the regulator will be actuated first in the one direction and then in the other, depending upon the variations of potential of the feeder circuits, and it will not be moved to any great extent from its mid position. If, however, it is caused to rotate in one direction to the limit of its normal movement, the pawl 66 or the pawl 67 will be released by the projections on the worm wheel segment 15 and the motor circuit will be interrupted, causing the moving member of the regulator to come to rest.

It will be evident to those skilled in the art that my invention is not in any way limited to the particular case described, but is applicable to any mechanism or system of control in which alternating current electromagnets are employed, either to operate or to control operation, and I desire that only such limitations shall be imposed as are indicated in the appended claims.

I claim as my invention:

1. The combination with an alternating current electro-magnet having normally separated stationary and movable core members and an energizing winding for bringing the members together, of means for maintaining a neutralizing influence upon the core members to prevent residual magnetization thereof while the magnet is out of active service.

2. The combination with an alternating current electro-magnet having normally separated stationary and movable core members and an energizing winding for bringing the members together, of means for reducing the current through the winding and preventing the core members from sticking together when the magnet is not effective.

3. The combination with an alternating current magnet having normally separated stationary and movable core members and an energizing winding for bringing the members together, of means of maintaining a small current through the winding to overcome the residual magnetization of the core members.

4. The combination with an alternating current electro-magnet having normally separated stationary and movable core members and an energizing winding for bringing the members together, of a predetermined amount of resistance to limit the current through the winding and eliminate the tendency of the core members to stick together.

5. The combination with an alternating current electro-magnet having normally separated stationary and movable core members and an energizing winding for bringing the members together, of means for inserting resistance or reactance in circuit with the energizing winding to prevent residual magnetization of the core members when the magnet is not effective.

In testimony whereof, I have hereunto subscribed my name this 26th day of Feb., 1910.

EDWIN LEHR.

Witnesses:
B. P. Rowe,
B. B. Hines.